United States Patent
Smith et al.

(10) Patent No.: US 8,955,791 B2
(45) Date of Patent: Feb. 17, 2015

(54) FIRST AND SECOND STAGE AIRCRAFT COUPLED IN TANDEM

(75) Inventors: Thomas R. Smith, Westminster, CA (US); Kevin G. Bowcutt, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 13/468,262

(22) Filed: May 10, 2012

(65) Prior Publication Data

US 2013/0299626 A1 Nov. 14, 2013

(51) Int. Cl.
*B64C 37/02* (2006.01)

(52) U.S. Cl.
USPC .......... 244/2; 244/158.9; 244/63; 244/171.11

(58) Field of Classification Search
USPC ......... 244/2, 171.1, 172.4, 171.3, 130, 158.9, 244/173.1, 172.5; 102/377
See application file for complete search history.

(56) References Cited

U.S. PATENT DOCUMENTS

| | | | | |
|---|---|---|---|---|
| 3,702,688 | A * | 11/1972 | Faget | 244/159.3 |
| 4,338,783 | A * | 7/1982 | Leingang | 60/225 |
| 4,802,639 | A * | 2/1989 | Hardy et al. | 244/2 |
| 5,031,857 | A | 7/1991 | MacConochie et al. | |
| 5,513,571 | A | 5/1996 | Grantz et al. | |
| 5,853,143 | A | 12/1998 | Bradley et al. | |
| 6,193,187 | B1 * | 2/2001 | Scott et al. | 244/2 |
| 6,257,527 | B1 * | 7/2001 | Redding et al. | 244/159.1 |
| 6,293,503 | B1 * | 9/2001 | Beal | 244/171.1 |
| 6,612,522 | B1 * | 9/2003 | Aldrin et al. | 244/2 |
| 6,634,594 | B1 | 10/2003 | Bowcutt | |
| 7,328,571 | B2 * | 2/2008 | Drake et al. | 60/204 |
| 7,753,315 | B2 * | 7/2010 | Troy | 244/171.3 |
| 7,762,077 | B2 * | 7/2010 | Pederson et al. | 60/767 |
| 8,528,853 | B2 * | 9/2013 | Luther | 244/2 |
| 8,534,598 | B2 * | 9/2013 | Salkeld | 244/63 |
| 2001/0048051 | A1 * | 12/2001 | Redding et al. | 244/162 |
| 2005/0000383 | A1 * | 1/2005 | Facciano et al. | 102/377 |
| 2005/0116110 | A1 * | 6/2005 | Mitzmacher | 244/137.4 |
| 2006/0032986 | A1 * | 2/2006 | Maker et al. | 244/171.6 |
| 2008/0128547 | A1 | 6/2008 | Pederson et al. | |
| 2009/0140101 | A1 * | 6/2009 | Salkeld | 244/159.3 |
| 2010/0251692 | A1 * | 10/2010 | Kinde, Sr. | 60/226.1 |
| 2012/0025006 | A1 * | 2/2012 | Luther | 244/2 |
| 2013/0256459 | A1 * | 10/2013 | Barber | 244/171.1 |
| 2013/0299626 | A1 * | 11/2013 | Smith et al. | 244/2 |

OTHER PUBLICATIONS

"NASA X-43" en.wikipedia.org/wiki/NASA_X-43 (downloaded Apr. 30, 2012).
"Boeing X-51" en.wikipedia.org/wiki/Boeing_X-51 (downloaded Apr. 30, 2012).
Vincent Noel, SURE-SPE Separation System AIAA-91/0967-CP (1991).

* cited by examiner

*Primary Examiner* — Christopher P Ellis
*Assistant Examiner* — Medhat Badawi
(74) *Attorney, Agent, or Firm* — Hugh P. Gortler

(57) ABSTRACT

A vehicle comprises a first stage supersonic aircraft, and a second stage hypersonic aircraft. The second stage aircraft is in tandem with the first stage aircraft.

20 Claims, 5 Drawing Sheets

FIG. 9A
FIG. 9B
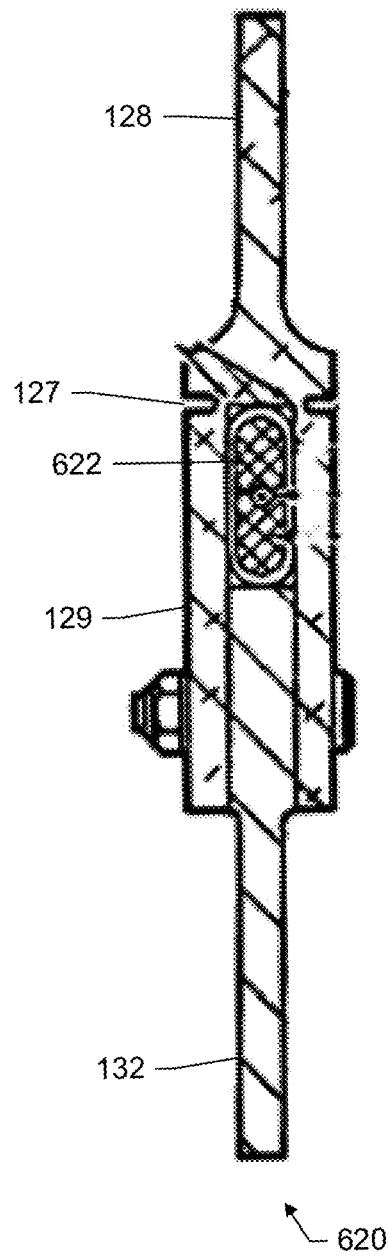
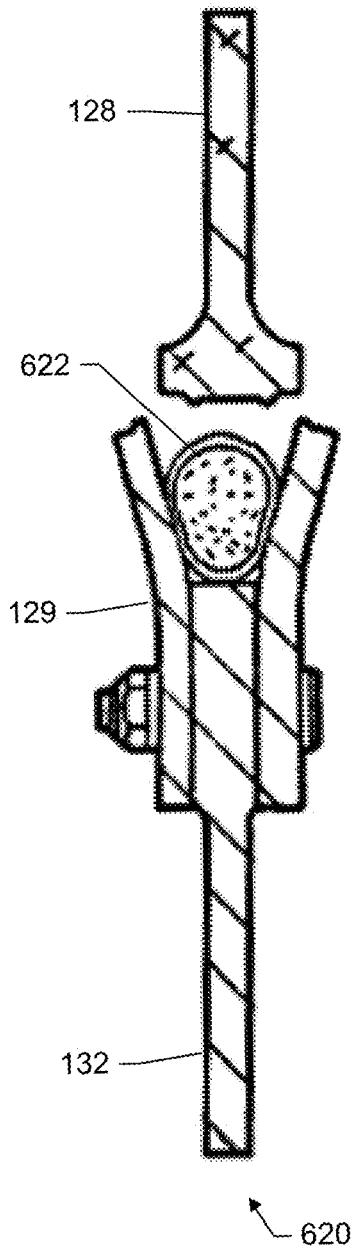

FIRST AND SECOND STAGE AIRCRAFT COUPLED IN TANDEM

BACKGROUND

Expendable launchers (e.g., multistage rockets) are typically used to place artificial satellites into low earth orbit (LEO). Many expendable launchers are derivatives of 1950s-era ballistic missiles. Back then, cost was not a major consideration in their design and operation. Now cost is a concern, especially with the rise of commercial space transportation.

The constantly shrinking size of electronics is making possible ever smaller satellites. New uses of small satellites weighing as little as ten pounds are envisioned.

However, the cost of launching small satellites is very high, typically at least three times higher than for large satellites on a per pound basis. Moreover, launch sites in the United States are few. Launches from the east coast of the United States are performed at the Kennedy Space Center at Cape Canaveral, Fla., and launches from the west coast are performed at Vandenberg Air Force Base in California. If a launch vehicle is tied to one of these sites, scheduling delays can result due to availability and weather. In addition, launch vehicles are constrained to tight launch windows and a narrow selection of orbits. These factors increase the cost of launch operations and preclude flexibility in launch windows and attainable orbits.

It would be desirable to reduce the cost of launching small payloads. It would also be desirable to increase the flexibility in launch windows.

SUMMARY

According to an embodiment herein, a vehicle comprises a first stage supersonic aircraft, and a second stage hypersonic aircraft. The second stage aircraft is in tandem with the first stage aircraft.

According to another embodiment herein, an aircraft comprises a fuselage including a forward portion, and a plurality of connecting arms spaced about a perimeter of the forward portion. The arms are connected to the forward portion and configured for pivoted movement between an extended position and a retracted position. In the retracted position, the arms form a blended aerodynamic surface with the forward portion.

According to another embodiment herein, a method of transporting a payload comprises accelerating a hypersonic aircraft to an altitude and speed for hypersonic operation. The hypersonic aircraft carries a rocket, and the rocket carries the payload. The method further comprises flying the hypersonic aircraft to a launch altitude and speed, and launching the rocket at the launch altitude and speed.

These features and functions may be achieved independently in various embodiments or may be combined in other embodiments. Further details of the embodiments can be seen with reference to the following description and drawings.

BRIEF DESCRIPTION OF THE DRAWINGS

FIGS. 9A and 9B are illustrations of a separation ring in the second embodiment of the interstage coupler.

DETAILED DESCRIPTION

Figure 1:
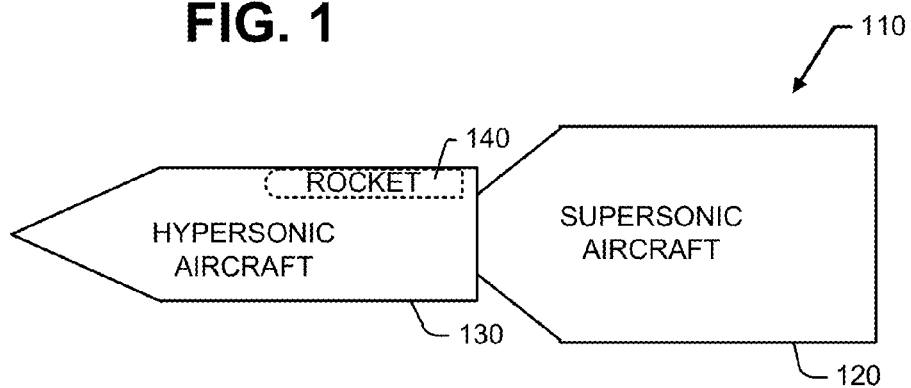
FIG. 1 is an illustration of a launch vehicle including a first stage supersonic aircraft, a second stage hypersonic aircraft, and a third stage rocket.

Reference is made to FIG. 1, which illustrates a launch vehicle 110. The launch vehicle 110 includes a first stage supersonic aircraft 120, and a second stage hypersonic aircraft 130. The second stage aircraft 130 is in tandem with the first stage aircraft 120.

The supersonic aircraft 120 may take off from the ground, or the launch vehicle 110 may be transported by a carrier aircraft to an altitude and speed suitable for subsonic and supersonic operation. At this suitable altitude and speed, the supersonic aircraft 120 takes over. The supersonic aircraft 120 transports the hypersonic aircraft 130 to an altitude and speed suitable for hypersonic operation. The supersonic aircraft 120 separates in-flight from the hypersonic aircraft 130, and the hypersonic aircraft 130 takes over. In the meantime, the supersonic aircraft 120 flies to a landing site.

A third stage rocket 140 is mounted to the hypersonic aircraft 130. The hypersonic aircraft 130 transports the rocket 140 to a launch altitude and high launch speed. Once the hypersonic aircraft 130 has completed its mission, it too flies back to a landing site.

The third stage rocket 140 is released from the hypersonic aircraft 130 at the launch altitude and its engine ignited. The rocket 140 carries a payload to a destination (e.g., a global location, low earth orbit).

By launching at a speed and altitude that are higher than attainable by a supersonic aircraft alone, the hypersonic aircraft 130 allows the size of the rocket 140 to be reduced. Moreover, the higher specific impulse of air-breathing propulsion on the aircraft 120 and 130 reduces required propellant mass of the rocket 140. The use of the hypersonic aircraft 130 reduces the size, complexity and cost of the rocket 140.

The launch vehicle 110 can launch many kinds of payloads. Examples include small satellites, small payloads delivered to the International Space Station and commercial orbital habitats, devices designed for servicing and maintenance of satellites, devices designed to de-orbit large and/or dangerous space debris, and payloads requiring rapid delivery between any two global locations.

In some embodiments, the supersonic aircraft 120 may have a delta wing configuration powered by a LOX/RP air-turbo-rocket (ATR) or a turbine engine designed or augmented to operate at a high supersonic speed. The supersonic aircraft 120 also has landing gear.

In some embodiments, the hypersonic aircraft 130 may employ a scramjet engine, in which combustion takes place in supersonic airflow. One example is the Boeing X-51. The scramjet on the Boeing X-51 has a rectangular inlet and combustor. However, the inlet and combustor of other vehicles may have different configurations. For example, the scramjet might have a circular combustor. Circular combustor scramjets may be more structurally efficient in resisting pressure loads than scramjets having a rectangular cross section. The hypersonic aircraft 130 also has landing gear.

The third stage rocket 140 may be piggybacked onto the hypersonic aircraft. For example, the rocket 140 may be attached to the hypersonic vehicle by a trapeze-type launcher mechanism similar to the missile launcher for the F-22 aircraft (e.g., the LAU-127 missile launcher). This mechanism ensures that the rocket 140 clears the hypersonic aircraft 130 after separation. The rocket 140 may be nested in the upper surface of the hypersonic aircraft's fuselage so it is shadowed by the upper surface. Air pressure is extremely low in shadow regions of hypersonic vehicles. Thus, the effect in terms of drag, lift, or any other force on the rocket 140 is negligible. The rocket 140 may use a solid or liquid propellant, and it may have thrust vector control.

In contrast to a multistage rocket, the launch vehicle 110 minimizes throwaway parts. The only expendable part may be the rocket 140. Yet in some embodiments, even the rocket 140 may be recovered and reused. A reusable rocket 140 may include a Reaction Control System (RCS) for exo-atmospheric control. The reusable rocket 140 may descend on a minimum heat load trajectory. Once subsonic and approaching a landing site, the rocket 140 may use its main propulsion system to right itself and land on deployable feet. The rocket 140 may be protected on ascent from modest aerodynamic heating with a thin layer of ablator material.

Figure 2:
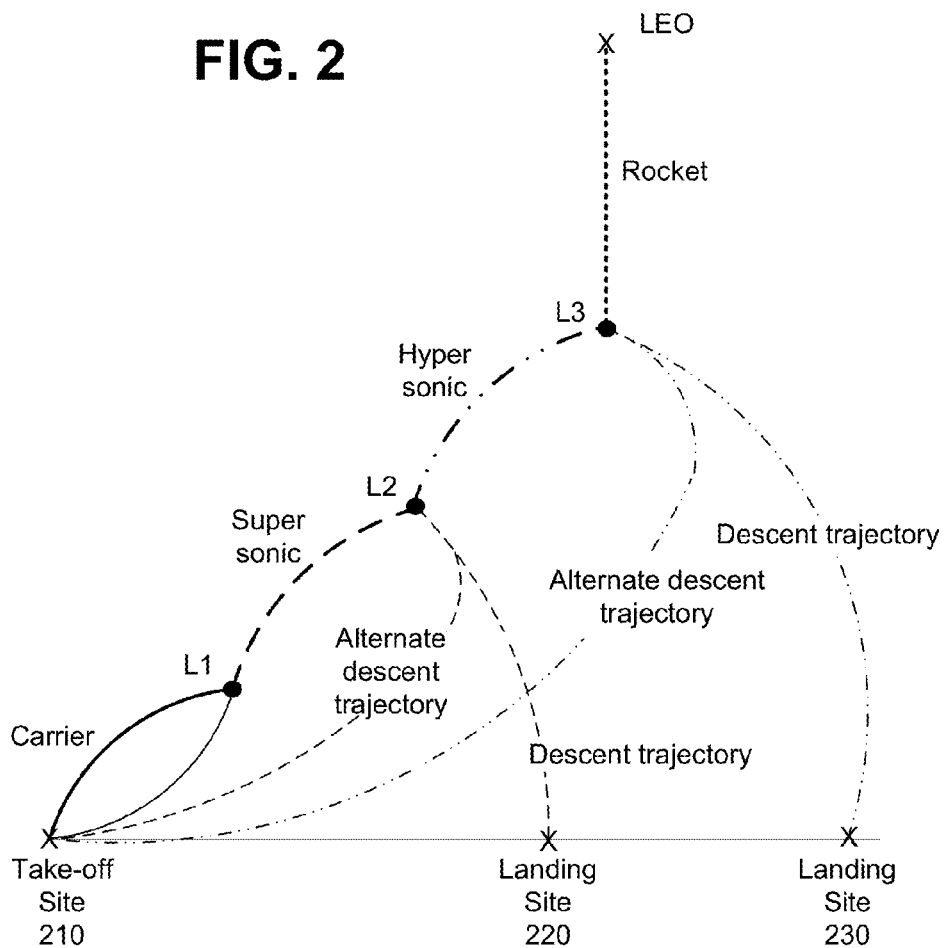
FIG. 2 is an illustration of take-off and landing sites for the launch vehicle.

Reference is made to FIG. 2. Consider the following example, which illustrates another advantage of the launch vehicle 110. In this example, the launch vehicle 110 is mounted to a carrier aircraft such as a Boeing B-52 Stratofortress or a Scaled Composites White Knight. The carrier aircraft takes off from a take-off site 210, transports the launch vehicle 110 to an altitude L1 and speed for first stage operation, releases the launch vehicle 110, and returns to the take-off site 210. The supersonic aircraft 120 begins operation, transports the hypersonic vehicle 130 to an altitude L2 and speed for supersonic flight, separates from the hypersonic vehicle 130, and is automatically guided back to a landing site. The landing site may be a remote site 220 or it may be the take off site 210. The carrier aircraft may fly up-range before dropping the launch vehicle 110 to minimize the distance the aircraft 120 and 130 must fly to the landing sites.

The hypersonic aircraft 130 transports the rocket 140 to a launch altitude L3 and speed and releases the rocket 140. The hypersonic aircraft 130 is then automatically guided back to a landing site. The landing site may be a remote site (e.g., landing site 230) or it may be the take-off site 210.

The rocket 140 is launched at the launch altitude L3. The rocket carries a payload to LEO.

Both aircraft 120 and 130 may be unmanned and autonomous. Ground control may only monitor progress and issue flight termination commands if needed. Rocket launch may be autonomous.

The launch vehicle 110 allows flexible basing at airports all over the world. Air-launch allows flexibility in launch location and maneuvering around weather.

In general, air-breathing engines produce less thrust than rockets, but produce it more efficiently. Due to lower thrust levels, vehicles with air-breathing engines are more sensitive to aerodynamic drag. The tandem coupling dramatically reduces drag resulting from the large frontal cross-sectional area of the vehicle because one vehicle shields the other. Moreover, the hypersonic aircraft 130 increases stack fineness ratio, which further reduces drag. As a result, the tandem coupling helps realize the potential efficiency advantage of air-breathing engines.

The supersonic aircraft 120 is coupled to the hypersonic aircraft 130 by an interstage coupler. The interstage coupler is released from an aft portion of the hypersonic aircraft's fuselage (e.g., an aft ring frame) to initiate separation. Just after separation, there may be a short time period where the supersonic aircraft 120 deploys air-brakes to separate quickly from the hypersonic aircraft 130. The engines of the hypersonic aircraft 130 may then be started.

Figure 3:
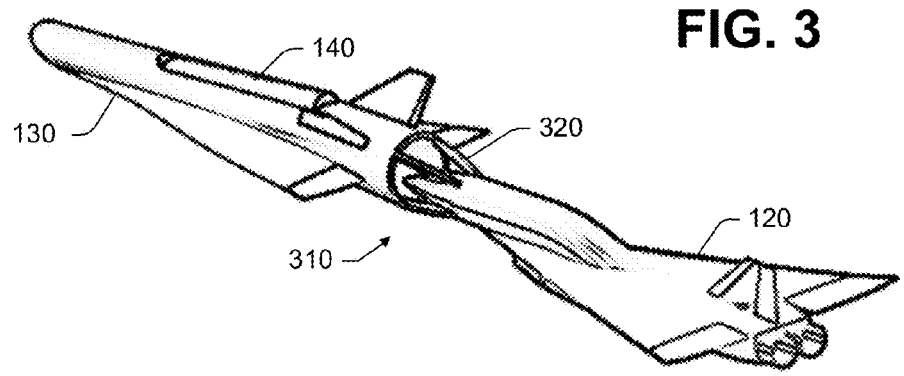
FIGS. 3-5 are illustrations of a first embodiment of an interstage coupler for the first and second stage aircraft.
Figure 4:
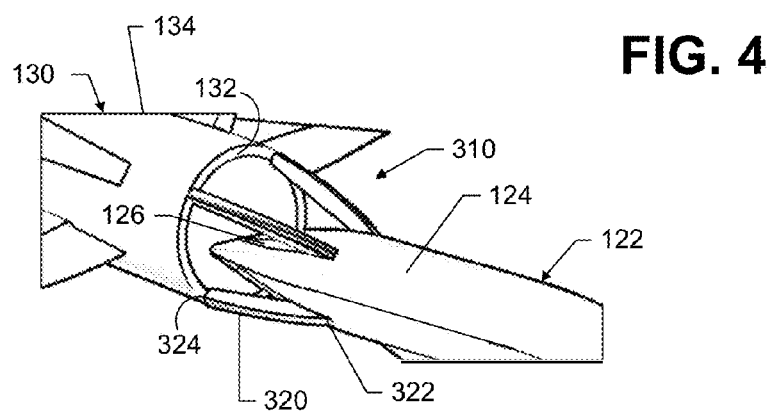

The following paragraphs describe three different embodiments of the interstage coupler. In embodiments one and two, the interstage coupler is integrated with the supersonic aircraft 120. An interstage coupler herein is not limited to these three embodiments Reference is now made to FIGS. 3-5, which illustrate an interstage coupler 310 having retractable arms 320 spaced about a perimeter of a nose section 124 of the supersonic aircraft's fuselage 122. First ends 322 of the arms 320 are connected to the nose section 122 for pivoted movement. Second ends 324 of the arms 320 are securable at the aft portion 132 of the hypersonic aircraft's fuselage 134. As shown in FIGS. 3 and 4, the second ends 324 of the arms 320 are secured to the aft portion 132 prior to in-flight separation via retractable bolts and frangible nuts.

The arms 320 may be distributed about the nose section 124 for relatively symmetric loading top and bottom, port and starboard. The arms 320 are decoupled from the aft portion 132 to initiate in-flight separation. The decoupling may be performed by actuating the frangible nuts.

The arms 320 are retracted in the shadow of the hypersonic aircraft 130 under supersonic speed and high dynamic pressure conditions (e.g., Q=2000 psf). The hypersonic aircraft 130 partially shields the arms 320 from the oncoming supersonic flow. The arms 320 are retracted while shielded.

Figure 5:
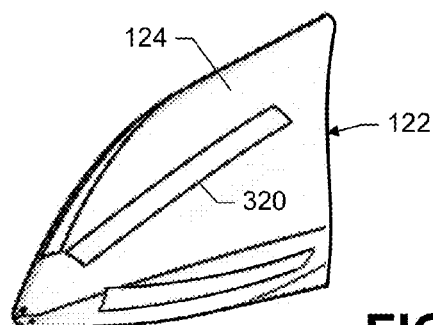

The nose section 124 of the supersonic aircraft 120 includes storage compartments 126 for storing the arms 320 after retraction. The arms 320 are configured so that, when fully retracted, they are flush with a surface of the nose section 124. As shown in FIG. 5, the retracted arms 320 become blended with the aerodynamic surface of the nose section 124.

Figure 6:
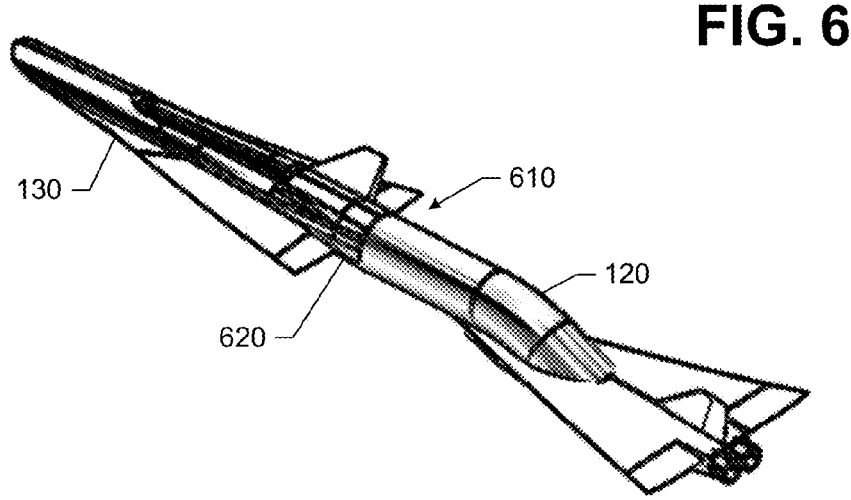
FIGS. 6-8 are illustrations of a second embodiment of an interstage coupler for the first and second stage aircraft.
Figure 7:
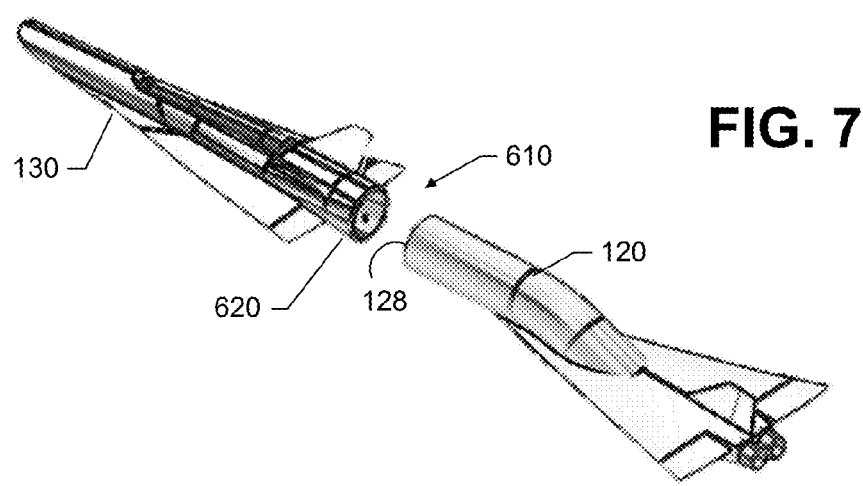
Figure 8:
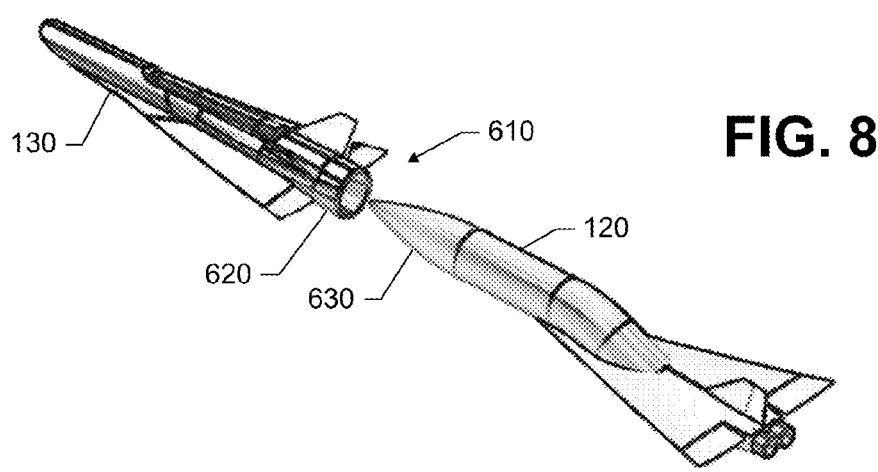

Reference is now made to FIGS. 6-8, which illustrate an interstage coupler 610 having tubular separation ring 620 and a deployable nose 630. This interstage coupler 610 may be used with a supersonic aircraft 120 having a blunt forward portion 128.

Prior to in-flight separation, the deployable nose 630 is stowed within the blunt forward portion 128. The blunt forward portion 128 of the supersonic aircraft 120 either terminates in, or is attached to, one end of the tubular separation ring 620. The aft portion of the hypersonic aircraft 130 either terminates in, or is attached to, an opposite end of the tubular separation ring 620. Thus, prior to in-flight separation, the ring 620 couples the supersonic aircraft 120 to the hypersonic aircraft 130.

A portion of the tubular separation ring 620 is designed to break under an explosive force. At in-flight separation, the explosive force is applied, the tubular separation ring 620 breaks apart, and the hypersonic aircraft is decoupled from the supersonic aircraft 120.

As shown in FIGS. 7 and 8, the nose 630 is deployed after in-flight separation. When fully deployed, the nose 630 provides an aerodynamic surface, which increases aerodynamic performance of the supersonic aircraft 120 and allows the supersonic aircraft 120 to fly to a landing site.

During deployment of the nose 630, the hypersonic aircraft 130 partially shields the nose 630 from the oncoming supersonic flow. The nose 630 is deployed while shielded.

Both aircraft 120 and 130 carry their portion of the ring 620 until landing. The ring 620 is replaced to couple the aircraft 120 and 130 for another flight.

In some embodiments, the deployable nose 630 may include an inflatable bladder, and outer skin made of a material such as a woven ceramic fabric (e.g., Nextel fabric). When inflated, the bladder replicates the nose of the supersonic aircraft 120. Such a deployable nose 630 is similar to inflatable ballistic decoys.

The deployable nose 630 may also include a deployable skeletal section for rigidity. As but one example, the skeletal structure may include pinned or hinged metal struts that unfold like an umbrella.

Reference is made to FIGS. 9A and 9B, which illustrate an example of the tubular separation ring 620. FIG. 9A illustrates the tubular separation ring 620 prior to in-flight separation. One end of the ring 620 is formed by, or attached to, the forward portion 128 of the supersonic aircraft 120. The forward portion 128 terminates in a clevis 129. The other end of the ring 620 is formed by, or attached to, the aft portion 132 of the hypersonic aircraft 130. The clevis 129 is fastened to the aft portion 132.

An explosive device 622 is located within the clevis 129, adjacent to the aft portion 132. The explosive device 622 may include an expanding tube, which contains a linear explosive and elastomer filler.

The forward portion further includes a break groove 127. During in-flight separation, the explosive device 622 is detonated.

As shown in FIG. 9B, the expanding tube of the exploded device 622 expands and causes the ring 620 to break along the break groove 127. The supersonic aircraft 120 is now decoupled from the hypersonic aircraft 130.

Figure 10:
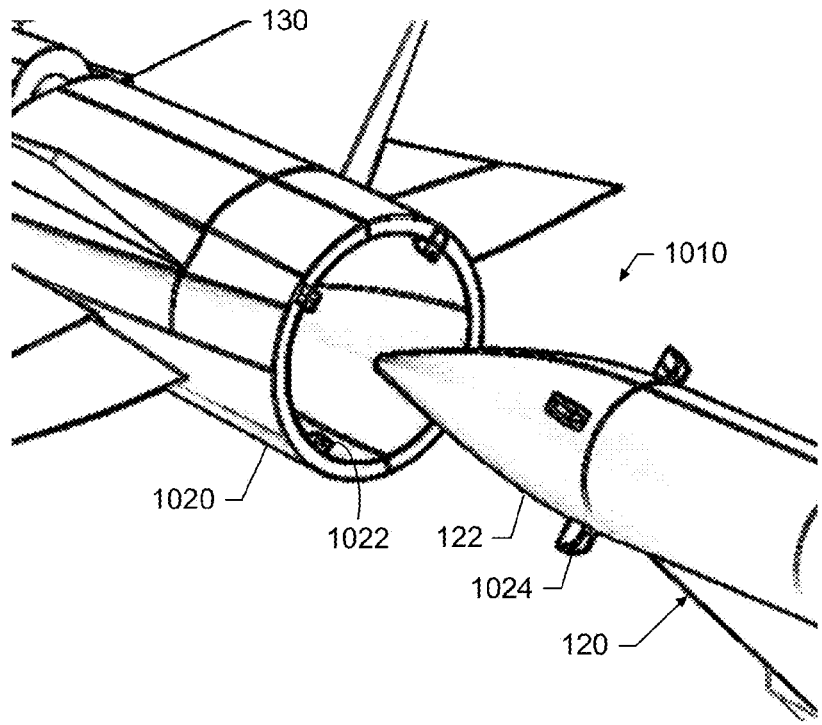
FIG. 10 is an illustration of a third embodiment of an interstage coupler for the first and second stage aircraft.

Reference is now made to FIG. 10, which illustrates an interstage coupler 1010 including an aft ring frame 1020 and at least one of frangible nuts and retracting bolts. The aft portion of the hypersonic aircraft 130 may be attached to, or terminate in, the aft ring frame 1020. Prior to in-flight separation, flanges 1022 on the aft ring frame 1020 are fastened to flanges 1024 on the nose section 122 of the supersonic aircraft 120. The flanges 1024 are fastened together by at least one of frangible nuts and retracting bolts (not shown).

To initiate in-flight-separation, the nuts are detonated. Unlike the other two embodiments, there is no need to retract arms or deploy a nose section in the presence of incoming supersonic airflow. Moreover, the nose section 122 is solid (unlike the interstage coupler 610).

Figure 11:
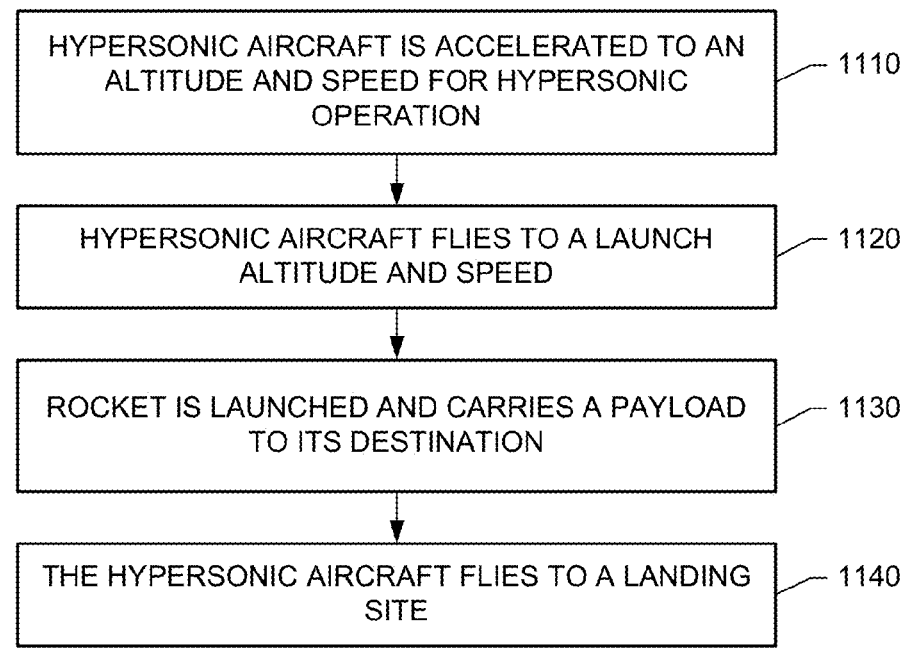
FIG. 11 is an illustration of a method of transporting a payload.

FIG. 11 illustrates a general method of transporting a payload. At block 1110, a hypersonic aircraft is accelerated to an altitude and speed for hypersonic operation. A supersonic aircraft having an air-breathing engine may be used to accelerate the hypersonic aircraft. The hypersonic aircraft is used to reduce transonic drag during operation of the supersonic aircraft.

The hypersonic aircraft carries a rocket. The rocket carries a payload.

At block 1120, the hypersonic aircraft takes over and flies to a launch altitude and speed. At block 1130, the rocket is launched. The rocket carries the payload to its destination.

At block 1140, the hypersonic aircraft flies to a landing site. The supersonic aircraft also files to a landing site.

This method may be used to place a relatively small satellite (weighing ten to several hundred pounds) in low earth orbit. For example, the hypersonic aircraft is accelerated to a speed of about Mach 4.5 and an altitude of about 50-60,000 feet. The hypersonic aircraft takes over and attains a launch speed of Mach 10 and a launch altitude of about 100,000 feet. A single stage rocket is launched at this speed and altitude. The rocket places the satellite in low earth orbit. In contrast, a multistage rocket would be needed to launch a similar payload from the ground or even from a supersonic aircraft.

The invention claimed is:

1. A vehicle comprising:
   a first stage aircraft;
   a second stage aircraft; and
   an interstage coupler for coupling a nose section of the first stage aircraft to an aft portion of the second stage aircraft's fuselage prior to in-flight separation, and for decoupling the first and second stage aircraft to initiate in-flight separation, wherein the interstage coupler includes a plurality of retractable arms spaced about a perimeter of a nose section of the first stage aircraft, first ends of the arms hinged to the nose section, and second ends of the arms securable to the aft portion of the second stage aircraft.

2. The vehicle of claim 1, wherein the first stage aircraft is a supersonic aircraft and the second stage aircraft is a hypersonic aircraft.

3. The vehicle of claim 2, further comprising a third stage rocket mounted to the second stage hypersonic aircraft.

4. The vehicle of claim 3, wherein the second stage hypersonic aircraft includes a scramjet engine.

5. The vehicle of claim 4, wherein the rocket is nested in an upper surface of the hypersonic aircraft's fuselage so it is shadowed by the upper surface.

6. The vehicle of claim 3, wherein both aircraft are unmanned and autonomous.

7. The launch vehicle of claim 1, wherein the nose section of the first stage aircraft includes storage compartments for storing the retractable arms after in-flight separation such that the arms form a blended surface with the nose section.

8. A vehicle comprising:
   a first stage aircraft;
   a second stage aircraft; and
   an interstage coupler for coupling a nose section of the first stage aircraft to an aft portion of the second state aircraft's fuselage prior to in-flight separation, and for decoupling the first and second stage aircraft to initiate in-flight separation;
   wherein the first stage aircraft includes a blunt forward portion and a deployable nose that is stowed in the forward portion prior to in-flight separation, the nose deployed at in-flight separation.

9. The launch vehicle of claim 8, wherein the interstage coupler includes a tubular separation ring having a breakable portion, the nose section of the first stage aircraft attached to one side of the breakable portion, the aft portion of the second stage aircraft attached to an opposite side of the breakable portion; and a device for breaking the breakable portion to initiate in-flight separation.

10. The vehicle of claim 8, wherein the first stage aircraft is a supersonic aircraft and the second stage aircraft is a hypersonic aircraft.

11. The vehicle of claim 10, wherein the second stage hypersonic aircraft includes a scramjet engine.

12. The vehicle of claim 10, further comprising a third stage rocket mounted to the second stage hypersonic aircraft.

13. The vehicle of claim 12, wherein the rocket is nested in an upper surface of the hypersonic aircraft's fuselage so it is shadowed by the upper surface.

14. The vehicle of claim 10, wherein both aircraft are unmanned and autonomous.

15. A vehicle comprising:
a first stage aircraft;
a second stage aircraft; and
an interstage coupler for coupling a nose section of the first stage aircraft to an aft portion of the second stage aircraft's fuselage prior to in-flight separation, and for decoupling the first and second stage aircraft to initiate in-flight separation, wherein the interstage coupler includes a separation ring and at least one of frangible nuts and retracting bolts for fastening the separation ring to the first stage aircraft prior to in-flight separation.

16. The vehicle of claim 15, wherein the first stage aircraft is a supersonic aircraft and the second stage aircraft is a hypersonic aircraft.

17. The vehicle of claim 16, wherein the second stage hypersonic aircraft includes a scramjet engine.

18. The vehicle of claim 16, further comprising a third stage rocket mounted to the second stage hypersonic aircraft.

19. The vehicle of claim 18, wherein the rocket is nested in an upper surface of the hypersonic aircraft's fuselage so it is shadowed by the upper surface.

20. The vehicle of claim 16, wherein both aircraft are unmanned and autonomous.

\* \* \* \* \*